Jan. 19, 1971  L. J. COLE  3,556,902
APPARATUS FOR STITCHING STRIP MATERIAL ONTO
THE PERIPHERY OF TIRE CARCASS
Filed April 17, 1968  6 Sheets-Sheet 1

Fig. 1.

Inventor:-
Leon J. Cole,
By Brown, Jackson, Boettcher & Dienner
Attys.

United States Patent Office 3,556,902
Patented Jan. 19, 1971

3,556,902
APPARATUS FOR STITCHING STRIP MATERIAL
ONTO THE PERIPHERY OF TIRE CARCASS
Leon J. Cole, Niles, Mich., assignor to National-Standard
Company, Niles, Mich., a corporation of Delaware
Filed Apr. 17, 1968, Ser. No. 721,991
Int. Cl. B29h 17/18
U.S. Cl. 156—412                16 Claims

ABSTRACT OF THE DISCLOSURE

Apparatus for stitching strip material, such as tire tread material, onto the peripheries of annular rotatable objects of different diameters within a given range of diameters of such annular objects, such as tire carcasses, embodying an endless belt including means for bringing the endless belt into engagement with the strip material to properly stitch the same to the periphery of any annular object of a diameter within the given range of diameters of such annular objects.

---

An important use, by way of example, to which the apparatus of the invention may be put resides in applying tire tread material to the periphery of a tire carcass of a pneumatic tire. It has been proposed to provide a stitching apparatus embodying an endless belt which may be readily engaged with the tire tread material laid on the outer periphery of the tire carcass, and with the arrangement being such that upon rotation of the tire carcass the tread material is stitched to the outer periphery of the tire carcass. The stitching is carried out to prevent entrapment of air between the tire tread material and the tire carcass and, additionally, pressure roll means are provided to apply pressure to the tread material to provide good adherence of the tread material to the tire carcass.

In the above stitching apparatus the endless belt is positioned with respect to the periphery of a tire carcass so that the run thereof at the tire carcass is displaced providing an outer surface of transverse and circumferential concave configuration for stitching tire tread material to the tire carcass. In such apparatus rollers over which the endless belt is trained are disposed in fixed spaced apart relation to provide the desired transverse and circumferential concave configuration to the run of the belt to properly apply the tread material to a tire carcass. The foregoing arrangement of the fixed axes of the rollers over which the endless belt is trained is applicable only for satisfactorily applying tread material to tire carcasses of limited range of diameters.

According to the present invention, an apparatus is provided incorporating chuck means for rotatably supporting a tire and with which chuck means there is associated adjustable chuck positioning means to provide for the support of tire carcasses of a given wide spread range of diameters adjacent endless belt means with their centers of rotation disposed for applying the tread material thereto. The endless belt means of the present invention incorporates belt displacement means for controlling the extent of displacement of the run of the belt for applying the tread material to the periphery of the tire carcass for properly applying the tread material to tire carcasses within the aforementioned given wide spread range of diameters of tire carcasses. Further, the apparatus of the present invention incorporates suspension means for adjustably supporting the endless belt means serving to dispose the endless belt and pressure roller means thereof to assure proper application of tire tread material to tire carcasses within a given range of diameters of such carcasses.

Accordingly it is an important object of the present invention to provide a stitching apparatus embodying an endless belt in which the circumferential extent of the concavity of the belt at the run thereof for applying the tread material may be controlled for satisfactorily applying tire tread material to tire carcasses of different diameters within a given wide range of diameters of such tire carcasses.

A further object of the invention is to provide suspension means for the endless belt means to orient the endless belt and pressure roller means associated therewith with respect to the axis of rotation of a tire carcass within a given range of diameters of tire carcasses to properly apply tread material thereto.

The above and other objects and advantages of the invention will be apparent from the following detailed description of a preferred embodiment of the invention shown in the accompanying drawings in which:

Figure 1:
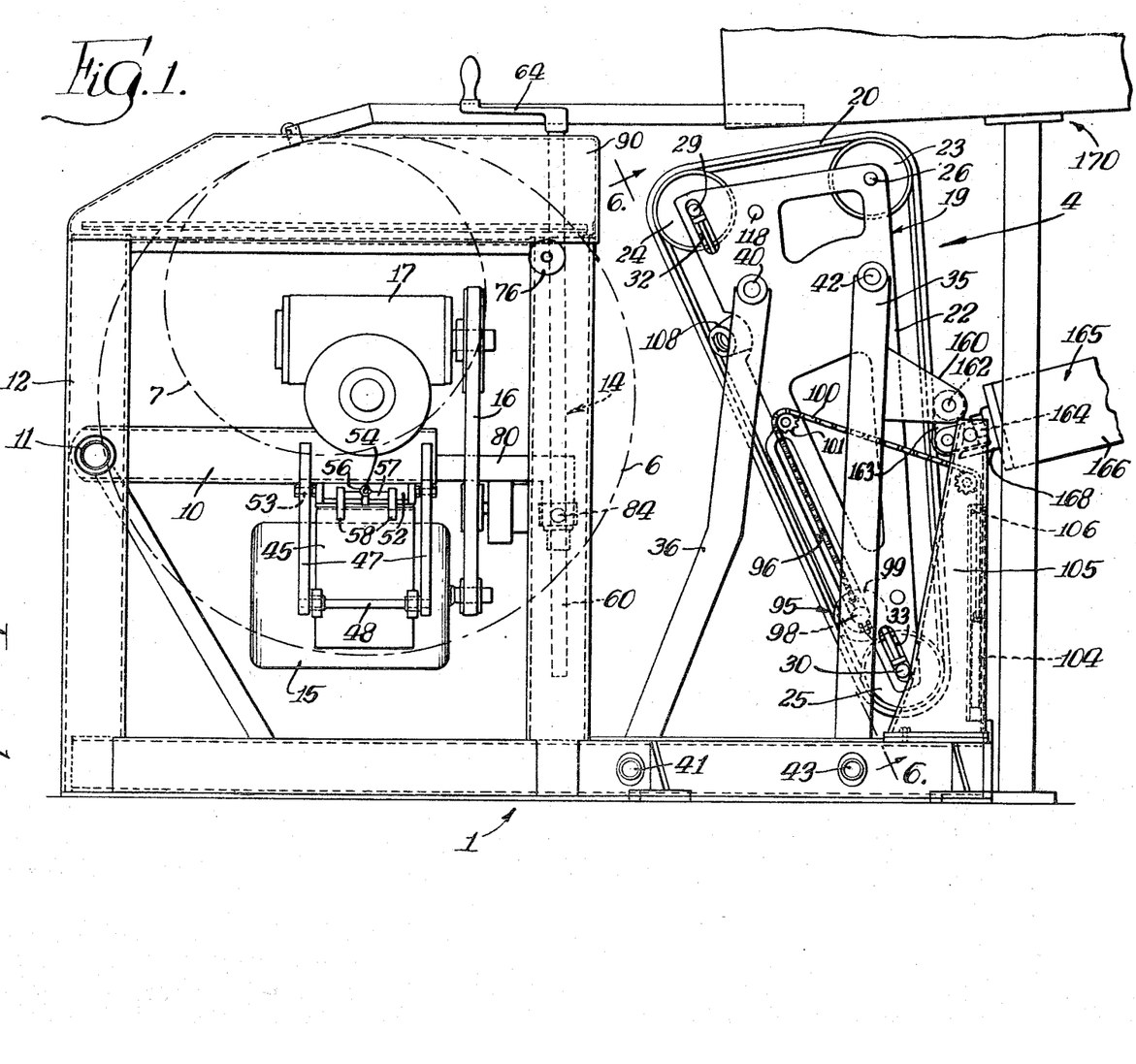
FIG. 1 is a side elevational view of the stitching apparatus of the present invention with the chuck means thereof at the left hand side of the figure and endless belt means at the right hand side of the figure.
Figures 2, 3:
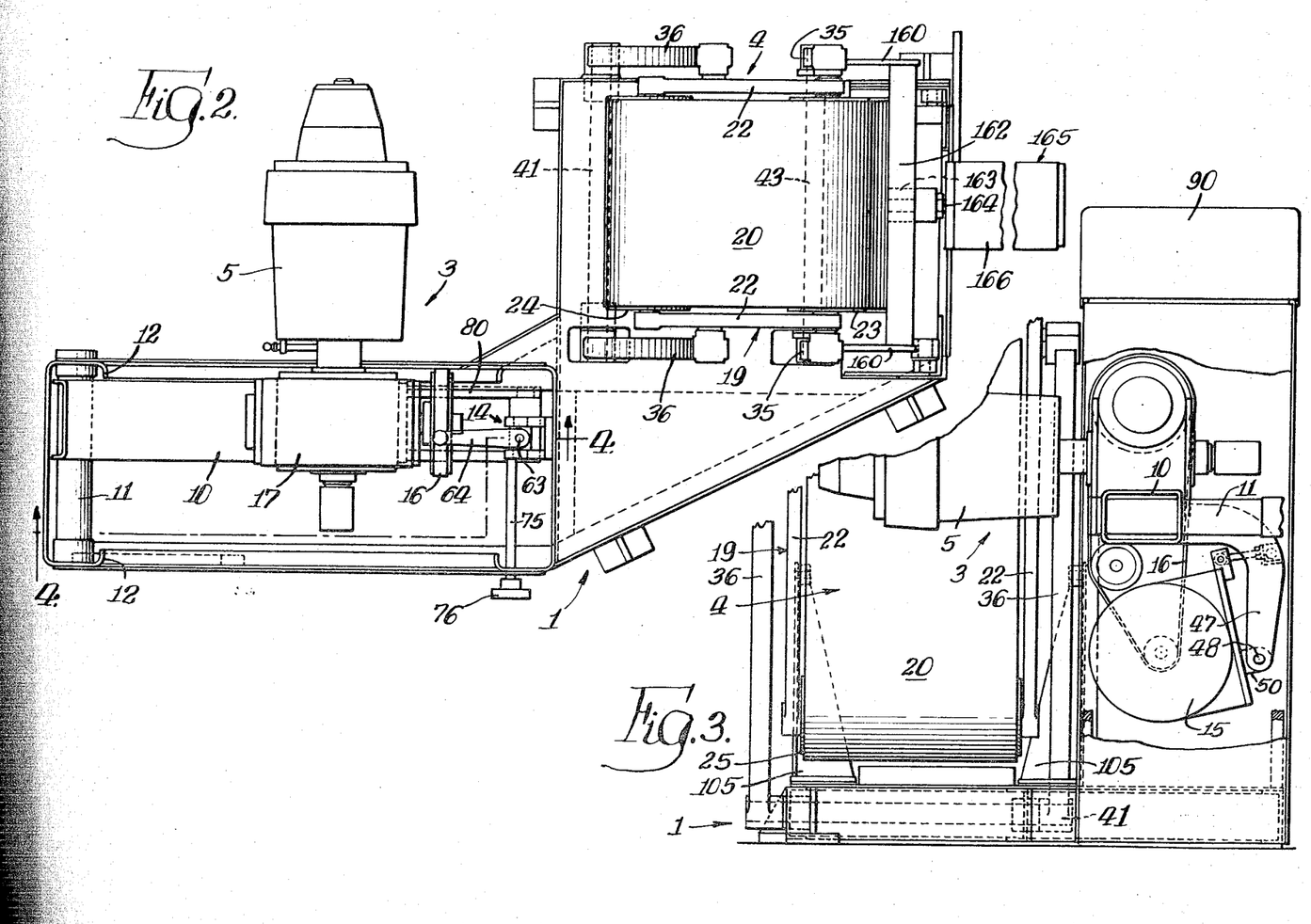
FIG. 2 is a plan view of the apparatus shown in FIG. 1.
FIG. 3 is an end view of the apparatus shown in FIGS. 1 and 2 as viewed from the left-hand end.

Referring now to FIGS. 1 through 3 of the drawings the embodiment of the invention there shown comprises a main frame 1 providing for the support of chuck means 3 and endless belt means 4. The chuck means 3 includes a radially expansible and contractible chuck 5 for supporting a tire carcass or casing for rotation about its rotational axis. The casing may be of any given diameter within a given wide range of diameters such as of large diameter as diagrammatically indicated in FIG. 1 at 6, or of smaller diameter as diagrammatically indicated at 7. The chuck 5 may be of the construction shown and described in U.S. Pat. No. 2,960,130 dated Nov. 15, 1960 to J. A. Smyser and which provides for supporting tire carcasses of a wide range of sizes. The tire carcass may, for example, be a carcass from which a worn tread has been removed and which it is desired to retread. The tire carcass is mounted on the chuck 5 in the collapsed position thereof and after which the chuck 5 is radially expanded to firmly hold the tire carcass. The tire carcass when mounted on the chuck may, as shown and described in the above mentioned United States patent, be charged with air under pressure or otherwise rigidly and firmly supported so that the outer peripheral surfaces of the tire carcass is firm for the application of tire tread material to the crown of the carcass. The chuck means 3 as shown is supported on a box-like frame member 10 pivotally mounted on the shaft 11 extending transversely between upright posts 12 at the front of the main frame 1. Chuck adjusting screw means, indicated generally at 14, is associated with the other end of the frame 10 to raise or lower such end of the frame about the axis of the pivot shaft 11 to provide for adjusting the position of the axis of rotation of the chuck 5 for supporting tire carcasses of a wide range of sizes for purposes to be presently described. The frame 10 also provides for the support of an electric motor 15 the armature shaft of which carries a pulley which effects driving of a belt 16 trained therearound and a pulley mounted on the shaft of gear reducer 17 for effecting rotation of the chuck 5.

The endless belt means 4 comprises an endless belt frame means 19 for supporting an endless belt 20 laterally of the chuck 5 to provide for stitching of tread material to the periphery of a tire carcass supported on the chuck. The endless belt frame means 19 is defined by a pair of spaced apart side frame members 22—22 for supporting a pair of upper belt guide rollers 23 and 24 between the upper ends thereof and a lower belt guide roller 25 between the lower ends thereof. The upper belt roller 23 is mounted on a shaft 26 supported at its opposite ends in the side frame members 22—22, and the upper belt roller 24 and the lower belt roller 25 are mounted on the ends of shafts 29 and 30, respectively, extending into slots 32 and 33, respectively, in the side frame members 22—22 and which shafts 29 and 30 are adjustably supported for taking up slack in the endless belt. The side frame members 22—22 are supported on the main frame 1 by suspension means comprising a pair of rocker arms 35 and 36, respectively, at each side of and lying outwardly of the side frame members 22—22. The rocker arms 35 are pivotally mounted at their upper ends on pivot shafts 42 extending laterally outwardly of the side frame members 22—22, and at their lower ends are pivotally mounted on pivot shaft 43 adjacent the base of the main frame 1. The rocker arms 36 are also pivotally mounted at their upper ends on pivot shafts 40 extending laterally outwardly of the side frame members 22—22, and at their lower ends are pivotally mounted at 41 on the base of the main frame 1. The distance between the pivots 40 and 42 at the upper ends of rocker arms 35 and 36 are spaced more closely together than the pivots 41 and 43 at the lower ends of the rocker arms 35 and 36, respectively, to provide a rocking action to the belt frame means 19 before the run of the endless belt 20 is engaged with a tire carcass on the chuck to properly position the belt with respect to the tire carcass. As will appear below the geometrical relationship of the rocker arms 35 and 36 and their pivotal mountings with respect to the endless belt frame means 19 accommodates positioning of the endless belt 20 for stitching tire carcass material to tires of varying diameters within a given range.

Referring now to FIGS. 1, 3, 4 and 5 of the drawings, it will be seen that the chuck means 3 is supported on the main frame 1 to provide for adjusting the position of the axis of rotation of the chuck 5 vertically and laterally relative to endless belt means 4. The electric motor 15 is also adjustably mounted relative to the gear reducer 17 as shown in the figures noted from which it will be seen that the motor 15 is mounted on a motor mounting plate 45 which is supported below the box frame 10 by a pair of angle arms 47 secured at their upper ends as by welding to the box frame 10. A pivot rod 48 extends between the lower ends of the angle arms 47 and through lugs 50 secured to the lower portion of motor plate 45 and inwardly of the lower ends of the angle arms 47. An angle bracket 52 is pivotally mounted at its opposite ends at 53 in the angle arms 47 and in a flange 55 of which the threaded end of a motor adjusting bolt 54 is adjustably secured by nuts 56. The other end of adjusting bolt 54 is pivotally mounted on shaft 57 extending between spaced apart lugs 58 secured to the motor mounting plate 45. Thus by adjusting the bolt 54 the motor mounting plate 45 may be pivoted about the pivot shaft 48 to desired position to adjust the tension of the drive belt extending from the pulley on the armature shaft of motor 15 to the pulley of the gear reducer 17.

Figure 4:
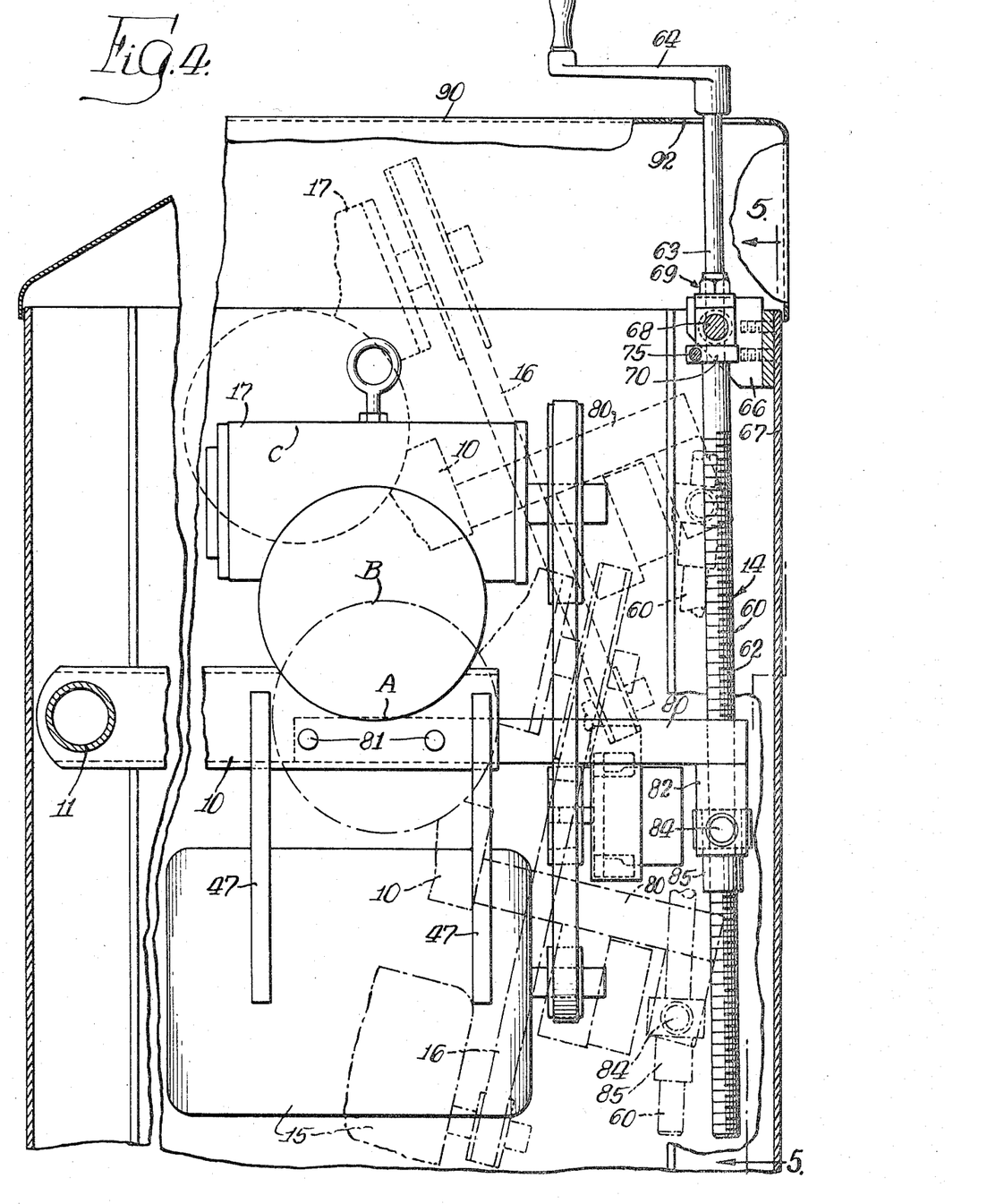
FIG. 4 is a view taken substantially along the line 4—4 of FIG. 2 looking in the direction indicated by the arrows and showing chuck adjusting means for adjusting the position of the chuck thereof.
Figures 5, 8:
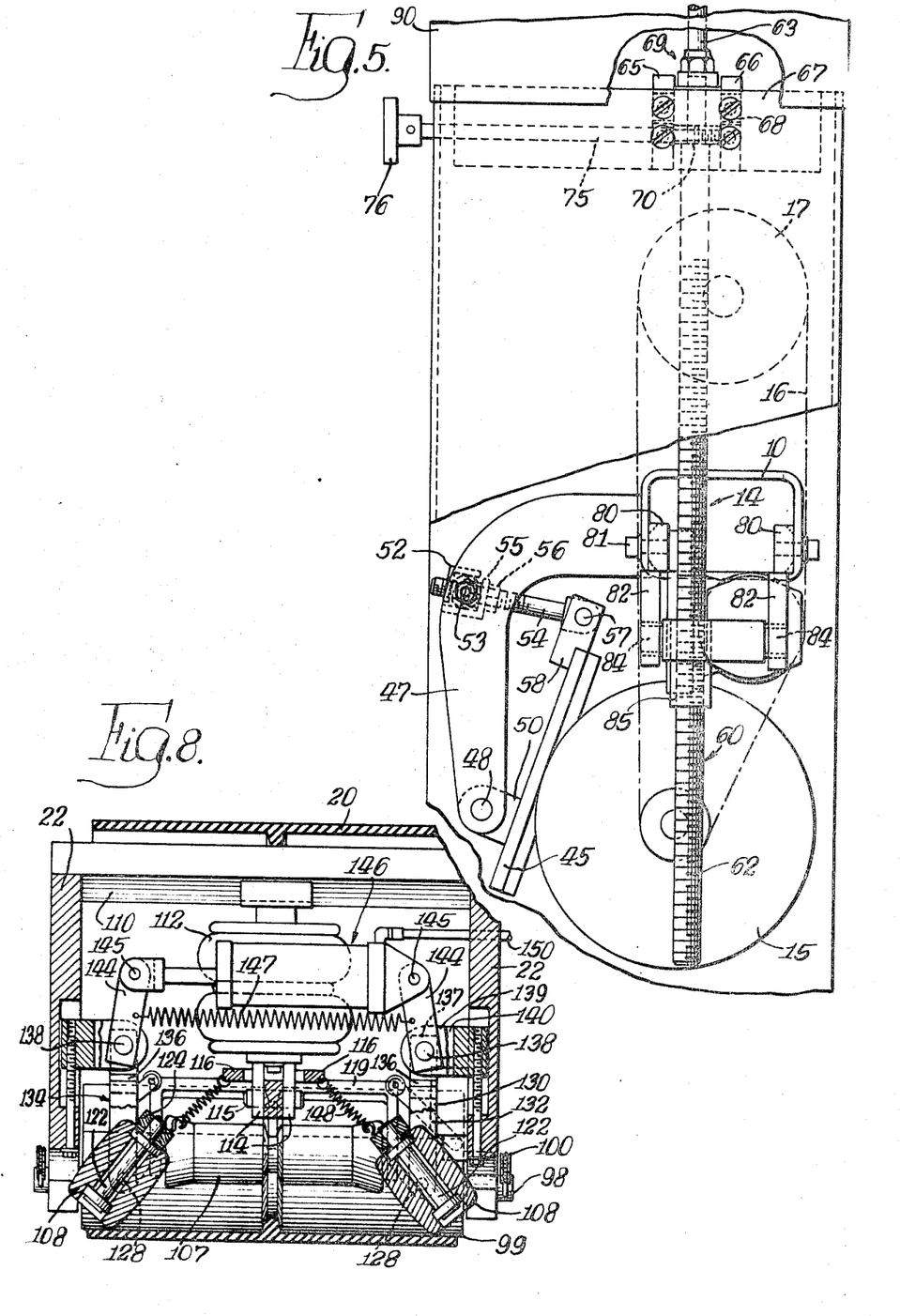
FIG. 5 is a view taken substantially along the line 5—5 of FIG. 4 looking in a direction indicated by the arrows showing screw means of the chuck adjusting means, and adjusting means for adjusting the position of a motor for driving the chuck.
FIG. 8 is a sectional view taken on line 8—8 of FIG. 7 looking in the direction indicated by the arrows.

The aforementioned chuck adjusting screw means 14, as best seen in FIGS. 4 and 5, comprises a screw shaft 60 having a main body threaded portion 62 and a reduced shaft upper portion 63 at the outer end of which a crank handle 64 is secured for effecting manual rotation of the screw shaft 60. A pair of spaced apart brackets 65 and 66 are secured inwardly at the upper end of the rear wall 67 which each receive a reduced journal end of a bearing 68. A thrust bearing assembly 69 is mounted on shaft portion 63 above the bearing 68. A lower bifurcated collar member 70 is disposed below bearing 68 at the juncture of shaft portions 63 and 62. One arm of the collar 70 is provided with a threaded opening 72 with which the threaded reduced inner end of rod 75 extending through the arms of the collar 70 has threaded engagement. A knob 76 is mounted at the outer end of the rod 75 to provide for rotation of the rod to engage the threaded inner end thereof to dispose the collar in clamping and unclamping positions with respect to shaft portion 63 for preventing or releasing the screw shaft 60 for rotation. The screw shaft 60 is arranged to extend between a pair of spaced apart parallel arms 80 secured as at 81 at their inner ends to the box frame 10 and from the outer ends of which depend a pair of spaced apart plate members 82 to receive therebetween the journal ends 84 of a ball nut assembly 85 threaded on main body portion 62 of screw shaft 60. Thus, in the arrangement described, with the lock pin in disengaged relation with respect to cam surface 72 crank 64 may be rotated to effect pivotal movement of box 10 about the pivot axis 11 to dispose the axis of rotation of the chuck 5 from a first position as indicated at A, typically to positions as at B and C to provide, as will be described, for adjustment of the apparatus for retreading tire carcasses of a wide range of diameters. The parts as shown in full lines is that at which the rotational axis of the chuck is in position B, and the positions of parts shown in dot-dash and dotted lines is when the rotational axis of the chuck 5 is in positions A and C, respectively.

After actuation of the crank handle 64 to dispose the axis of rotation of the chuck to desired position the rod 75 may be actuated to dispose collar member 70 to its clamping position to retain the chuck assembly in its adjusted position. It will be observed that the axis of screw shaft means 14 upon rotation of crank handle 64 rotates with bearing 68 and to this end the upper end of housing 90 is slotted at 92 to permit movement of the upper end of reduced shaft 63 to and fro in the slot for the desired adjusted position of the axis of rotation of chuck 5.

Figure 7:
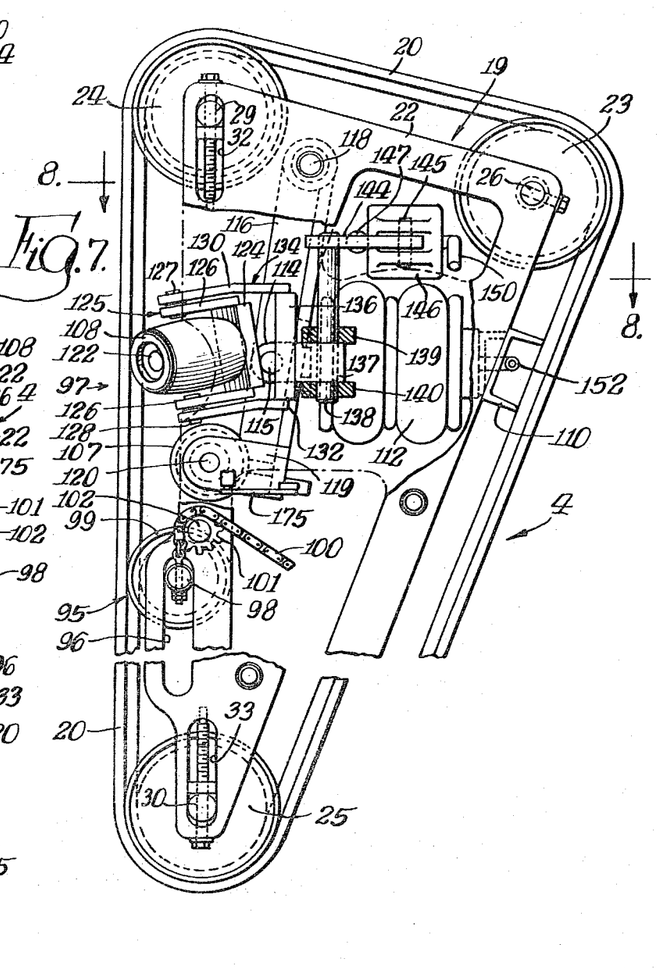
FIG. 7 is a side elevational view of the endless belt means shown in FIG. 6 with portions of the endless belt frame means broken away to show pressure roller means of the endless belt means.

Referring again to the endless belt means 4 it will be seen upon reference to FIGS. 1, 7 and 8 that it embodies belt displacement means 95 defined by an elongated slot 96 formed in each of the side frame members 22 at portions thereof inwardly and parallel with the run of the endless belt 20 between lower belt roller 25 and a pressure roller assembly, indicated generally at 97. Opposite ends of a shaft 98 rotatably supporting a belt displacement roller 99 are disposed in the slots 96 for movement to and fro in the slots to desired positions with respect to the adjacent run of the endless belt 20. A chain 100 is connected at each end of shaft 98 and are trained over sprockets 101 mounted for rotation on pins 102 secured in the side frame members 22 above the upper ends of the slots 96. The chains 100 at their other ends, as seen in FIG. 1, extend into channel members 104 fixed to and lying inwardly of a pair of spaced apart standards 105 fixed rearwardly to the base of the main frame 1. A stop member 106 is secured in predetermined position within each of the channel members 104 for engaging the ends of the chains to anchor or arrest movement of such inner ends for purposes to be described.

Figure 6:
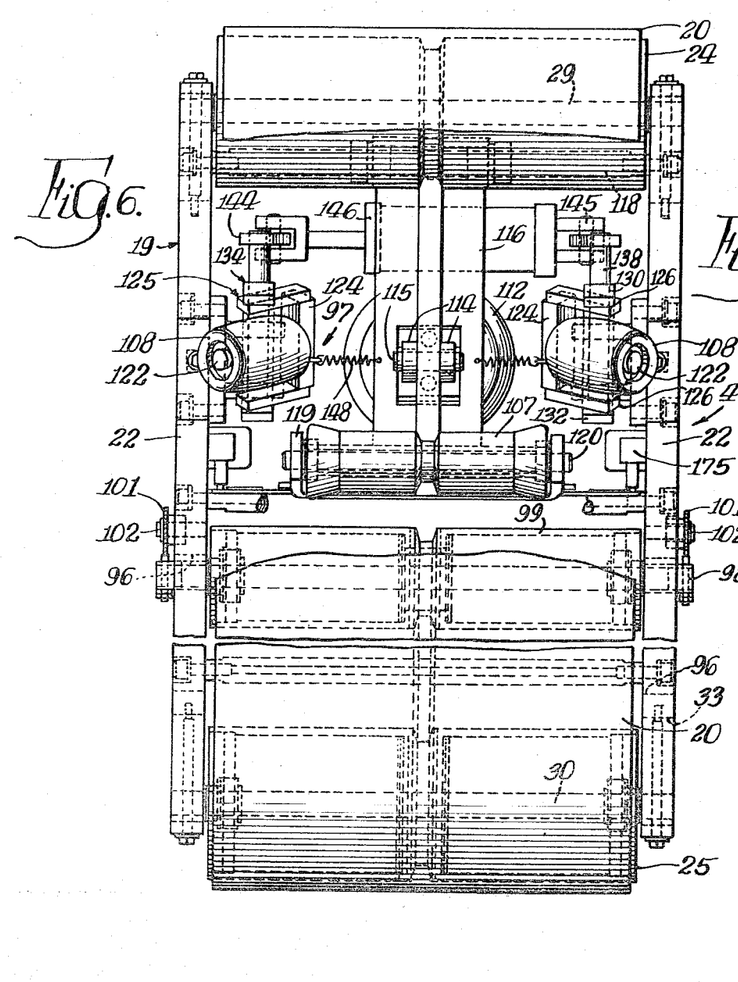
FIG. 6 is a view taken substantially along line 6—6 of FIG. 1 looking in the direction indicated by the arrows and showing the endless belt means of the invention.

The endless belt means 4, as best seen in FIGS. 6, 7 and 8, further comprises the aforementioned pressure roller assembly 97 supported on the endless belt frame for supporting a crown pressure roller 107 inwardly of the run of the endless belt between belt roller 24 and the belt displacement roller 99, and tread wing pressure rollers 108—108 above crown pressure roller 107. The pressure roller assembly 97 comprises a channel frame member 110 connected to and extending between the spaced apart side frame members 22—22. An air spring 112 is seated at one end on channel frame member 110 extending transversely between side frame members 22. The air spring 112 at its other end carries a pair of spaced apart lugs 114 pivotally connected as at 115 intermediate the ends of link means 116 which at its upper end is pivotally mounted on shaft 118 secured between the upper ends of the side frame members 22 adjacent the belt roller 24. The lower end of the link means 116 form a bifurcated bracket 119 the opposite ends of which support a shaft 120 for rotatably supporting the crown pressure roller 107, which is movable toward and away from the endless belt 20 upon energization and de-energization of the air spring 112.

The aforementioned tread wing pressure rollers 108 are mounted for rotation on bearing supported pin means 122 the inner ends of which are securely mounted in the bight portions 124 of the U-shaped frame members 125. The outer ends of the arms 126 of the U-shaped frame members 125 are pivotally connected at 127 and 128 to the outer ends of arms 130 and 132 of U-shaped frame members 134, respectively. The inner ends of arms 130 and 132 of the U-shaped frame members 134 are connected by bight portions 136 from which intermediate end portions 137 are keyed to a pin 138 extending through spaced apart brackets 139 and 140 secured to the inside surfaces of the side plates 22. Links 144 keyed to the upper ends of pins 138 are pivotally connected at their opposite ends, as at 145, to a piston and cylinder assembly 146. Upon energization of the piston and cylinder assembly 146 the links 144 are moved outwardly which in turn through the components above described effect movement of the outer ends of the U-shaped frames 134 toward each other. A spring 147 connects the opposed links 144 and serves to normally bias the links 144 toward each other. Springs 148 are connected at the inner ends of the bight portions 124 of the U-shaped frames 125 and at their other ends to link means 116 to normally bias the tread wing rollers 108 to the positions thereof shown in FIG. 8. The pivotal connections at 127 and 128 of the U-shaped frame 125 in the U-shaped frame 134 provide a pivot axis extending angularly downwardly and inwardly of the endless belt frame for displacement of the tread wing pressure rollers 108 when the endless belt is engaged with a tire carcass to positions opposite the tread wing portions of the carcass.

Referring again to FIGS. 1 and 2, it will be seen that rearwardly extending bracket members 160 are secured to the rocker arms 35 of the endless belt suspension means, and which brackets are connected by a transversely extending rod 162 from which a lug 163 extends and is pivotally connected to the end of a piston rod 164 of a piston and cylinder assembly 165. The cylinder 166 of the piston and cylinder assembly 165 is mounted on a transversely extending bracket 168 pivotally mounted at its opposite ends in the upper end portions of the standards 105. Thus upon actuation of the piston and cylinder assembly 166 the endless belt means 4 through the aforedescribed suspension means is movable toward and away from the chuck means 3 of the apparatus.

In the apparatus shown in FIG. 1 strip material supporting means 170 is disposed rearwardly of the endless belt means 4 providing for the delivery of strip material such as tire tread material as from an extruder for delivery over the endless belt means 4 and to the periphery of a tire carcass supported on a chuck 5. In the apparatus of the present invention, tire tread material may be fed from any suitable source for laying on the outer periphery of a tire carcass or if desired camelback material may be applied to the tire carcass in the presently known and conventional manner.

OPERATION

Figure 9:
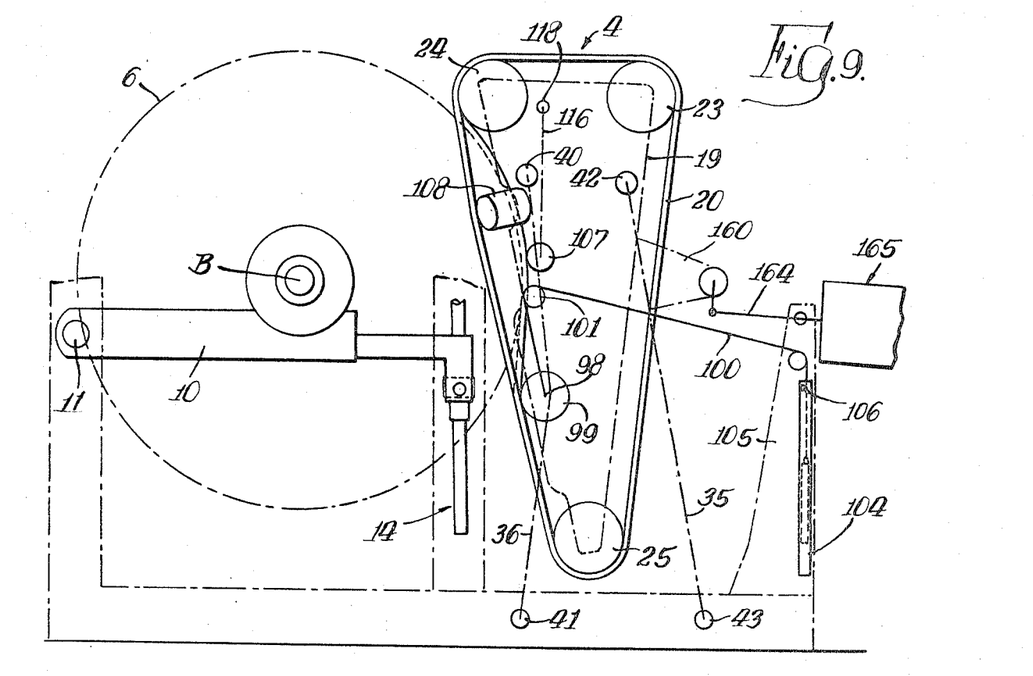
FIG. 9 is a diagrammatic view showing the position of the parts in applying tread material to a tire of large diameter within given range of diameters of tires to which tread material may be applied by the apparatus of the invention.

In the position of the parts as shown in FIGS. 1 through 3 the endless belt means 4 is in its retracted position, and an annular object such as a tire carcass to which strip material such as tire tread material is to be stitched is assembled on the chuck 5 and the chuck expanded and the tire carcass inflated. Assuming a large diameter tire carcass, such as shown at 6 in FIGS. 1 and 9, is to have a tread applied thereto the chuck is disposed by actuating the screw adjustment means 14 to position the periphery of the tire carcass just below the delivery end of the tire tread supporting means 170 which is at a fixed point or position with respect to the periphery of the carcass. The tread material is then applied around the tire carcass by rotating the chuck 5 which, for example, may be under the control of a foot switch which controls the electric motor 15 of the chuck means 3. After one revolution of the tire carcass to cover the tread area of the carcass, the motor 15 is de-energized. The tread material from the supply source is then severed and a splice is formed between the leading end of the tread material and the severed end from the supply. This splice may, if desired, be hand stitched with known tools for this purpose. Thereafter the piston and cylinder assembly 165 is actuated to move endless belt means 4 from the retracted position shown in FIG. 1 to the stitching position shown in FIG. 9 displacing the run of the belt 20 between the belt roller 24 and belt displacement roller 99 into engagement with the tire carcass material mounted on the carcass.

The belt displacement roller 99 upon actuation of the piston and cylinder assembly 165 to dispose the endless belt means 4 to stitching position is moved toward belt roller 24 upon engagement of the ends of chains 100 with the stop members 106 which then effects movement of the ends of the shaft carrying roller 99 to appropriately determine the extent of circumferentially displacement of the belt in proper stitching relation to the carcass.

Conveniently, if desired, limit switch means 175 as may be seen in FIG. 7 may be actuated upon engagement of the run of the belt therewith for initiating energization of motor 15 for rotating the chuck and suitable solenoid valves for actuating the air spring 112 and the piston and cylinder assembly 146 and which, together with timer means which may be utilized for controlling the cycle of operation of the apparatus. The piston and cylinder assembly 165 has thus advanced the endless belt means 4 into stitching position with respect to the tread material on the inflated tire carcass, and the pressure roller means 107 and wing tread pressure roller means 108 have been positioned against the adjacent run of the endless belt 20 to form the endless belt 20 into an arcuate configuration in its lengthwise and transverse directions conforming substantially to the configuration of the tread material on the inflated tire carcass. The aforedescribed pivotal connections 40 and 41 for rocker arm 36, and 42 and 43 for rocker arms 35 are so located so that the crown pressure roller 107 applies force radially to the tire tread material at the crown of the carcass, and tread wing pressure rollers 108 provide substantial radial and lateral forces to the tread material to stitch the same to the tire carcass. It will be noted that crown pressure roller 108 has a concave outer surface for cooperation with the convex surface of the tire carcass. The tread wing pressure rollers are preferably of barrel like configuration to stitch the tread wing portions of the tread material to the tread wing portions of the carcass. It will be noted that the pivot axes of the tread wing rollers 108 defined by the pivots 126 and 128 provide for positioning of the tread wing rollers in proper stitching position with respect to the tread wing portions of the tread material on the carcass Thus, upon rotation of the tire carcass, the tread material on the periphery thereof is pressure stitched to the carcass. In the large diameter tire carcass, as shown at 6 in the advancement of the endless belt means 4 towards the chuck 5 for engaging the belt with the tread material on the tire carcass it will be observed that the chains 110 engage the anchors at the upper ends of the channels 104 so that in movement of the endless belt means 4 toward the chuck 5 the belt displacement roller 99 is raised upwardly toward the pressure roller assembly. The belt displacement roller 99 is thus moved to a position to provide for determining the proper linear extent to which the endless belt is displaced to properly adhere the tread material to the tire carcass.

The chuck 5 may be rotated one or more times to thus apply the tire tread material to the carcass as controlled by the aforementioned timing means. After the stitching has been completed the air spring 112 for crown pressure roller 107 and piston and cylinder assembly 146 for the tread wing rollers 108 are actuated to permit their rollers to return to their non-stitching positions. The piston and cylinder assembly 165 may be actuated to retract the endless belt means to its retracted position. The treaded carcass on the chuck may then be removed so that the components of the apparatus are in their starting positions for applying tread material to another tire carcass or casing.

Figure 10:
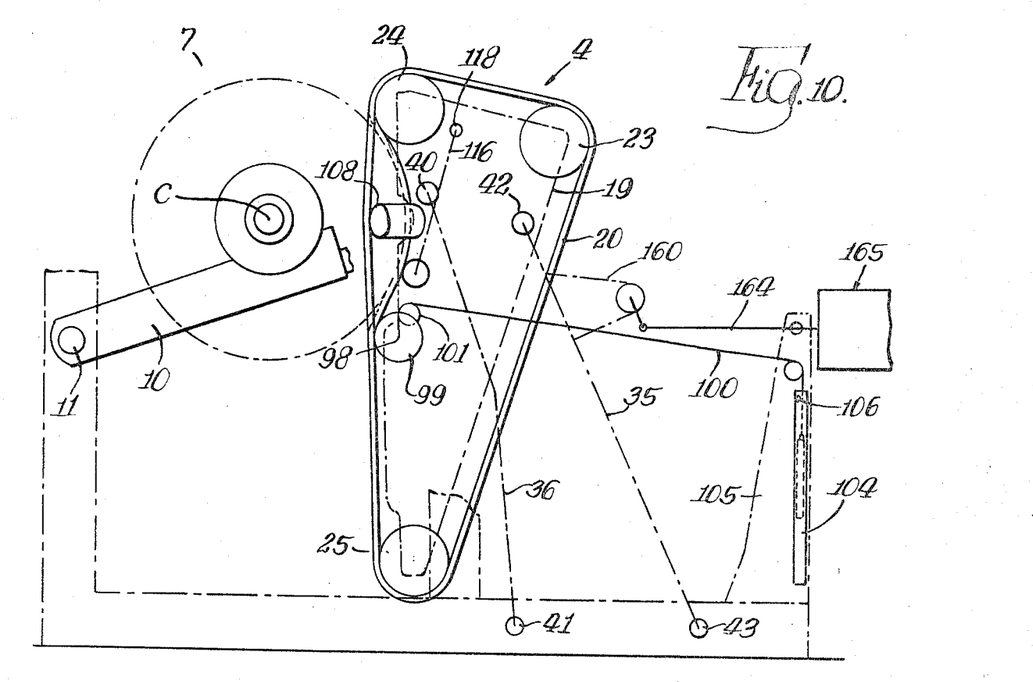
FIG. 10 is a diagrammatic view of the apparatus in applying tread material to a tire of a smaller diameter than that shown in FIG. 8 and within the given range of diameters of tires with which the apparatus may be employed.

Should it be desired to apply tire tread material to a tire casing of smaller diameter than casing 6, such as upon a casing 7 as shown in FIG. 10 the screw adjusting means 14 is actuated to dispose the axis of rotation of the chuck as, for example, at the point C as indicated in FIGS. 4 and 10 to position the periphery of the tire carcass at the delivery end of the tire tread feeding and supporting means in the manner above described in connection with the application of tire tread material of the tire carcass 6. With such a smaller diameter tire casing it will be observed that the piston and cylinder assembly 165 provides for effecting movement of the endless belt assembly inwardly to a greater extent than that in connection with a larger diameter tire but in which the above described suspension means automatically disposes the crown pressure roller 107 and the tread wing pressure rollers 108 in their same relative position with respect to carcass 7 as they were with respect to carcass 6 to properly stitch the tire tread material to the tire carcass 7. Also it will be observed that the belt adjustment roller 99 has been advanced more closely to the upper belt roller 24 to provide a less linear extent of deformation of the run of the belt in engagement with the tread material on the tire carcass to again provide for the effective engagement of the belt with the tread material to apply the latter to the tire carcass.

The association of the aforediscussed pivot points for the rocker arms 35 and 36 of the suspension means for the endless belt means 4 is such as to properly position the crown pressure roller 107 and tread wing rollers 108 and to control the linear length of the displacement of the endless belt by displacement roller 99 to effectively engage the displaced portion of the endless belt for effecting a proper stitching operation. Also, the pivotal mounting of the tread wing rollers 107 enable them to assume stitching positions for stitching the tread wing portions of the tread material to the tread wing portions of the carcass.

The apparatus above described thus has utility for applying tread material to tire carcasses of a wide range of diameters with the only adjustment required being that of the screw means 14 to appropriately position the axis of rotation of the chuck.

In the apparatus above described, upon appropriately setting any tire size by chuck adjusting screw means 14 with respect to the application of the tire tread material thereto from the tire tread supporting and supply means 170, no other adjustments are required to effectively stitch tire tread material to tire carcasses of a wide range of diameters. In all instances the periphery of the tire with the tire tread material applied thereto serve as a stop by engagement with the endless belt 20 of the endless belt means 4 at the belt roller 24 to properly orient the components of endless belt means 4 to effect a stitching operation. It will be understood that a variable speed motor may be employed to drive the chuck 5 at any given speed. Normally with large diameter tires the chuck 5 will be rotated at a lower speed than for small diameter tires. Usually a single revolution of the carcass is sufficient to apply tread material thereto but if desired the carcass may be rotated more than once.

What is claimed is:

1. An apparatus for stitching strip material onto the periphery of any one of a plurality of rotatable annular objects of different diameters within a predetermined range of diameters comprising chuck means including a chuck for supporting any one of said annular objects for rotation about its axis of rotation, endless belt means comprising belt frame means, and an endless belt supported on said belt frame means, suspension means for supporting said belt frame means for movement thereof to dispose said endless belt in stitching and non-stitching positions with respect to an annular object on said chuck, said endless belt in said stitching position having a run thereof displaced by an annular object on said chuck providing an outer surface of transverse and circumferential concave configuration, and belt displacement means associated with said endless belt for predetermining the linear extent of displacement of said run of said endless belt for annular objects of different diameters, where said belt displacement means is actuated by the movement of said frame means from said non-stitching position to said stitching position to determine the linear extent of displacement of said run in direct proportion to the extent of movement of said frame means.

2. The apparatus of claim 1 in which said run of endless belt is provided by training of said endless belt over belt rollers mounted on said belt frame means for rotation on fixed spaced apart axes, and in which said belt displacement means comprises a displacement roller for engaging the inner surface of said run of said endless belt and movable between said fixed axes of said belt rollers.

3. The apparatus of claim 1 comprising strip material supporting means for supplying strip material to the periphery of an annular object on said chuck, and adjusting means for said chuck means for adjusting the axis of rotation of said chuck with the periphery of an annular object thereon disposed immediately below the discharge end of said strip material supporting means.

4. The apparatus of claim 1 comprising pressure roller assembly means supported by said belt frame means for biasing said run of said endless belt into engagement with the strip material on said annular object.

5. The apparatus of claim 1 characterized by the provision of adjusting means for said chuck means to provide a predetermined axis of rotation of said chuck for annular objects of different diameters, pressure roller assembly means supported by said belt frame means inwardly of said run of said endless belt, and means for said suspension means to dispose said pressure roller assembly to substantially radially bias said run of said endless belt into engagement with the strip material on any one of said annular objects in the stitching position of said endless belt at the predetermined axis of rotation of said chuck for annular objects of different diameters.

6. The apparatus of claim 2 characterized by said belt displacement means comprising chain means connected at one end to said belt displacement roller, and stop means adapted to be engaged by the other end of said chain means upon predetermined movement of said suspension means to engage said endless belt with an annular object on said chuck to dispose said belt displacement roller in predetermined position with respect to said run of said endless belt.

7. The apparatus of claim 2 comprising pressure roller assembly means supported by said belt frame means for biasing said run of said endless belt into engagement with the strip material on said annular object, and said displacement means comprising means adapted upon predetermined movement of said suspension means to engage said run of said endless belt with an annular object on said chuck to dispose said belt displacement roller in predetermined position with respect to said run of said endless belt.

8. An apparatus for stitching tire tread material laid on the periphery of any one of a plurality of rotatable annular tire carcasses within a predetermined range of diameters comprising chuck means including a chuck for supporting any one of said tire carcasses for rotation about its axis of rotation, endless belt means comprising belt frame means, and an endless belt supported on said belt frame means, suspension means for supporting said belt frame means for movement thereof to dispose said endless belt in stitching and non-stitching positions with respect to a tire carcass on said chuck, said endless belt in said stitching position having a run thereof displaced by the carcass on said chuck providing an outer surface of transverse and circumferential concave configuration, and belt displacement means associated with said endless belt for predetermining the linear extent of displacement of said run of said endless belt for tire carcasses of different diameters, where said belt displacement means is actuated by the movement of said frame means from said non-stitching position to said stitching position to determine the linear extent of displacement of said run in direct proportion to the extent of movement of said frame means.

9. The apparatus of claim 8 in which said run of said endless belt is provided by training of said endless belt over belt rollers mounted on said belt frame means for rotation on fixed spaced apart axes, and in which said belt displacement means comprises a displacement roller for engaging the inner surface of said run of said endless belt and movable between said fixed axes of said belt rollers.

10. The apparatus of claim 8 comprising tire tread material supporting means for supplying tire tread material onto the periphery of any one of said tire carcasses, and chuck adjusting means for adjusting the axis of rotation of said chuck to support any one of said tire carcasses with the periphery thereof disposed immediately below the discharge end of said tire tread material supporting means.

11. The apparatus of claim 8 characterized by the provision of adjusting means for adjusting said chuck means to provide a predetermined axis of rotation for said chuck for tire carcasses of different diameters within said given range of diameters, pressure roller assembly means supported on said belt frame means inwardly of said run of said endless belt, and means for said suspension means to dispose said pressure roller assembly to substantially radially bias said run of said endless belt into engagement with the tire tread material in any one of said tire carcasses in the stitching position of said endless belt.

12. The apparatus of claim 11 characterized by said pressure roller assembly comprising crown pressure roller means and tread wing pressure roller means, means for biasing said crown pressure roller means into engagement with said run of said endless belt to engage the tire tread material with the crown portion of said carcass, and means for biasing said tread wing roller means into engagement with said side portions of said endless belt to bias the tread wing portions of said tire tread material into pressure engagement with the tread wing portions of said annular carcass.

13. The apparatus of claim 12 comprising means for said suspension means to substantially radially bias said run of said endless belt into engagement with the tire tread material at the crown of said carcass, and the side edges of the endless belt with the tread wing portions of said tread material on any of said tire carcasses in the stitching position of said endless belt.

14. The apparatus of claim 13 characterized by said belt displacement means comprising chain means connected at one end to said belt displacement roller, and stop means adapted to be engaged by the other end of said chain means upon predetermined movement of said suspension means to engage said endless belt with tread material on said tire carcasses with the tire carcass on said chuck to dispose said belt displacement roller in predetermined position with respect to said run of said endless belt.

15. An apparatus for stitching tire tread material laid on the periphery of any one of a plurality of rotatable annular tire carcasses within a predetermined range of diameters comprising chuck means including a chuck for supporting any one of said tire carcasses for rotation about its axis of rotation, endless belt means comprising belt frame means, and an endless belt supported on said belt frame means, suspension means for supporting said belt frame means for movement thereof to dispose said endless belt in stitching and non-stitching positions with respect to a tire carcass on said chuck, said endless belt in said stitching position having a run thereof displaced by the carcass on said chuck providing an outer surface of transverse and circumferential concave configuration, pressure roller assembly means supported by said belt frame means inwardly of said run of said endless belt, and means for said suspension means to dispose said pressure roller assembly to substantially radially bias said run of said endless belt into engagement with tire tread material on any one of said tire carcasses in the stitching position of said endless belt at the predetermined axis of rotation of said chuck for tire carcasses of different diameters, tire tread material supporting means for supplying tire tread material onto the periphery of any one of said tire carcasses, and chuck adjusting means for adjusting the axis of rotation of said chuck to support any one of said tire carcasses with the periphery thereof disposed immediately below the discharge end of said tire tread material supporting means.

16. The apparatus of claim 15 characterized by said pressure roller assembly comprising crown pressure roller means and tread wing pressure roller means, means for biasing said crown pressure roller means into engagement with said run of said endless belt to engage the tire tread material with the crown portion of said carcass, and means for biasing said tread wing roller means into engagement with said side portions of said endless belt to bias the tread wing portions of said tire tread material into pressure engagement with the tread wing portions of said annular carcass.

References Cited

UNITED STATES PATENTS

| | | | |
|---|---|---|---|
| 1,041,544 | 10/1912 | Williams | 156—412X |
| 2,581,933 | 1/1952 | Stevens | 156—408X |

BENJAMIN A. BORCHELT, Primary Examiner

S. C. BENTLEY, Assistant Examiner

U.S. Cl. X.R.

156—405